United States Patent [19]

Davis

[11] 4,156,048
[45] May 22, 1979

[54] SOFT FLOOR COVERING PROTECTOR FOR APPLIANCES

[76] Inventor: Lyle W. Davis, P.O. Box 347, Kerrville, Tex. 78028

[21] Appl. No.: 874,633

[22] Filed: Feb. 2, 1978

[51] Int. Cl.² .............................................. C09J 7/02
[52] U.S. Cl. .................................. 428/354; 248/346; 428/343; 428/447; 428/452
[58] Field of Search ............... 428/447, 354, 352, 452, 428/343; 52/514, 515, 716, 506, 390, 122, 126, 263; 248/350, 346, 20

[56] References Cited

U.S. PATENT DOCUMENTS

| | | | |
|---|---|---|---|
| 2,902,389 | 9/1959 | Keil | 428/354 |
| 3,333,805 | 8/1967 | Marshall | 248/350 |
| 3,362,666 | 1/1968 | O'Donnell | 248/350 |
| 3,616,118 | 10/1971 | Porter | 248/350 |
| 3,623,942 | 11/1971 | Yerrick | 428/447 |
| 3,650,808 | 3/1972 | Gaynon | 428/447 |
| 3,788,941 | 1/1974 | Kupits | 428/352 |
| 3,816,164 | 6/1974 | Pepe | 428/447 |
| 3,907,241 | 9/1975 | Oglesby | 248/346 |
| 3,955,035 | 5/1976 | Ito | 428/447 |

Primary Examiner—Ellis P. Robinson
Attorney, Agent, or Firm—Clarence A. O'Brien; Harvey B. Jacobson

[57] ABSTRACT

A pair of panel strips constructed of hard stiff material are provided for disposition on soft flooring surfaces beneath corresponding opposite side legs of an appliance. The strips include upper and lower surfaces and the upper surfaces are coated with a hard coating of silicone lubricant while the bottom surfaces of the strips have double-sided adhesive strips adhesively secured thereto. With the panel strips adhesively secured to a soft flooring surface, an appliance supported from the upper surfaces of the panel strips may have the front end thereof elevated slightly above the strips and a forward thrust applied thereto in order to slide the appliance forwardly along the strips upon which the rear legs thereof rest until the rear legs of the appliance approach the front ends of the strips. Thereafter, the front portion of the appliance may be lowered into contact with the opposing flooring surfaces and, because the appliance has been forwardly displaced, access to the rear of the appliance for cleaning the latter and for cleaning the floor surface over which the appliance is usually disposed may be had.

4 Claims, 3 Drawing Figures

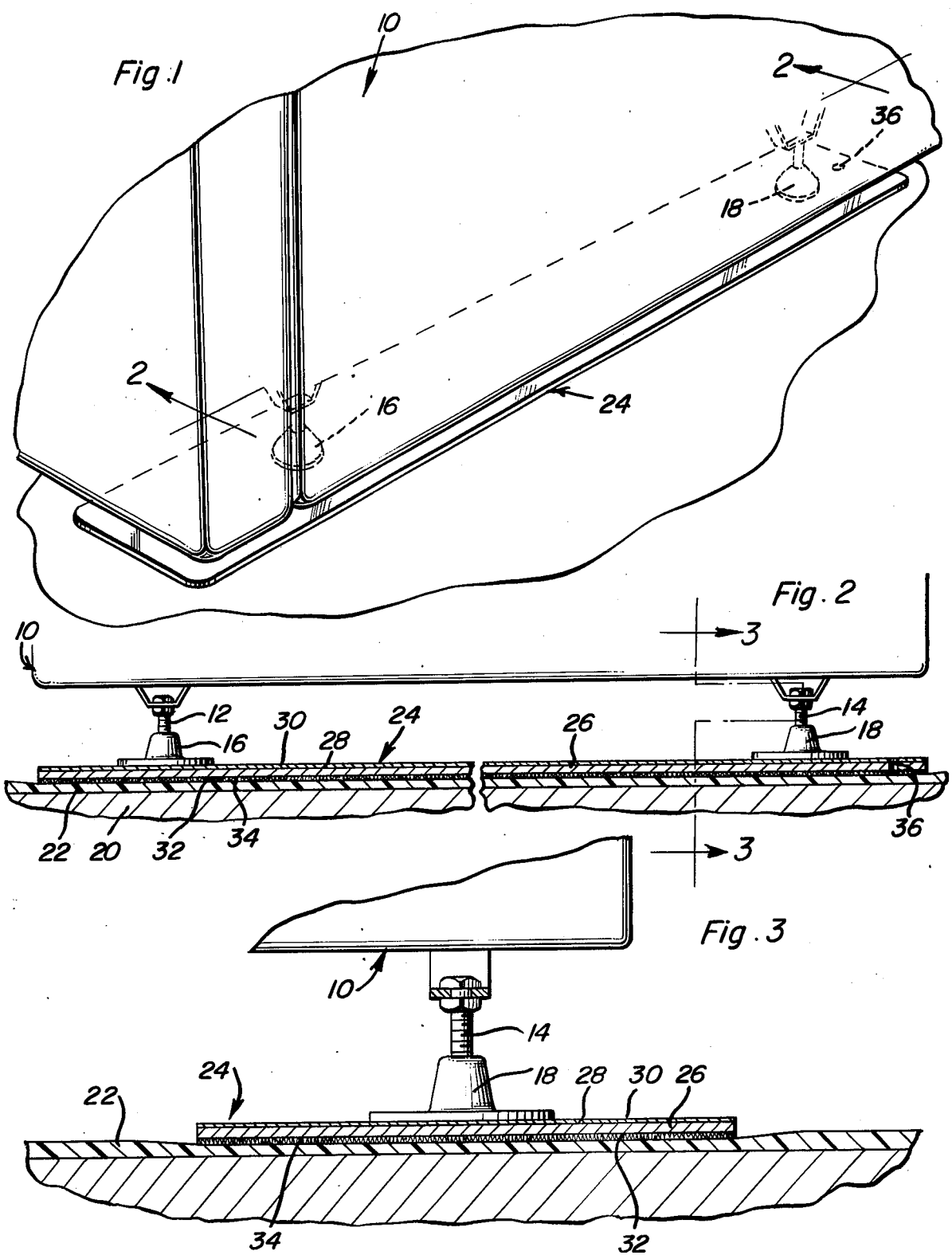

SOFT FLOOR COVERING PROTECTOR FOR APPLIANCES

BACKGROUND OF THE INVENTION

Large appliances such as refrigerators, freezers, washers and driers occasionally must be moved outwardly from wall surfaces in order that the rear of the appliances may be cleaned and the floor surfaces beneath the appliances may be cleaned. When the conventional flooring surfaces in kitchens and laundry rooms were hard and resistant to damage as a result of heavy appliances being slid thereover, damage to flooring surfaces was rare. However, with the increasing popularity of soft flooring surfaces or coverings for kitchens and laundry rooms, movement of large appliances out from the wall in order to clean the rear of the appliances or to clean the floor surfaces behind the appliances often results in the soft flooring coverings being damaged. In addition, heavy appliances are difficult to slide over soft flooring surfaces, even if the feet of the appliances do not dig into the soft flooring surfaces. Accordingly, a need exists for structure enabling heavy appliances to be readily moved outwardly from the walls against which they are backed.

Examples of various forms of previously known floor protectors are disclosed in U.S. Pat. Nos. 900,548, 956,547, 3,333,805, 3,362,666 and 3,669,490.

BRIEF DESCRIPTION OF THE INVENTION

The floor covering protector of the instant invention comprises a pair of strips including adhesive undercoatings for adhesive securement, with the strips disposed in parallel relation, to a soft floor covering on the area of the floor covering normally occupied by a heavy appliance, such as a refrigerator, freezer, washer or drier. The strips are adapted to have the front and rear legs of the corresponding sides of the appliance rest thereon and the upper surfaces of the strips are coated with a silicone lubricant whereby the feet or legs of the appliance may readily slide along the upper surfaces of the strips. In this manner, with the strips adhesively secured to the underlying soft floor covering, the floor covering is protected by the strips and the appliance may be readily shifted along the strips in its initial movement outward from the wall. Of course, the strips do not extend forwardly of the appliance and thus the front of the appliance must be lifted above the strips in order that only the rear legs of the appliance slide forwardly along the strips. After the appliance has been displaced forwardly, the front legs or feet thereof may be lowered into engagement with the underlying floor covering and access may be had to the rear of the appliance for cleaning the latter or cleaning the floor surface over which the appliance usually rests.

The main object of this invention is to provide structure whereby the floor covering beneath the legs or feet of heavy appliances may be protected.

Another object of this invention is to provide structure whereby heavy appliances may be readily slid out from a wall.

Still another important object of this invention is to provide an apparatus, in accordance with the preceding objects, and which will be adapted to support various sizes of appliances therefrom.

A final object of this invention to be specifically enumerated herein is to provide a floor covering protector, in accordance with the preceding objects, and which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmentary, perspective view of one side portion of an appliance, such as a refrigerator or freezer, and with one of the strips comprising the protector of the instant invention in position beneath and front and rear legs of the corresponding side of the appliance;

FIG. 2 is a fragmentary, vertical, sectional view taken substantially upon the plane indicated by the section line 2—2 of FIG. 1; and FIG. 3 is a fragmentary, enlarged, vertical, sectional view taken substantially upon the plane indicated by the section line 3—3 of FIG. 2.

DETAILED DESCRIPTION OF THE INVENTION

Referring now more specifically to the drawings, the numeral 10 generally designates an appliance which may comprise a conventional refrigerator or freezer. The appliance 10 includes pairs of front and rear adjustable height legs 12 and 14 including lower end feet 16 and 18.

The appliance 10 usually is supported from a floor 20 and the floor 20 has a soft floor covering 22 applied thereover. Conventionally, sliding of the appliance 10 over the soft floor covering 22 can result in the feet 16 and 18 of the appliance 10 marring the floor covering.

The protector of the instant invention includes a pair of strips referred to in general by the reference numeral 24, only one strip being illustrated, and each strip 24 comprises a strip member 26 constructed of hard stiff material. The strip members 26 each include an upper surface 28 to which there is applied a hard lubricant coating 30 of silicone. The strip members 26 each also include an undersurface 32 and a strip 34 of double sided adhesive tape is applied to each undersurface 32. The uppersurfaces of the tapes 34 are thus adhesively secured to the undersurfaces 32 of the strip members 26 and the undersurfaces of the strip members 34 are thus adhesively secured to the uppersurface of the soft floor covering 22.

The strip members 26 are applied to the floor covering 22 in proper spaced parallel relation whereby the opposite side front and rear feet 16 and 18 of the appliance 10 will rest upon the center portions of the strip members 26. The strip members 26 may be provided of any suitable length and cut to the desired length after purchase. In addition, one end of each strip member 26 includes an aperture 36 formed therethrough whereby the strip member 26 may be suitably hung in a displayed manner prior to purchase.

After the strip members 26 have been applied to the floor covering 22 in proper position thereon and the appliance 10 has its feet 16 and 18 positioned upon the coating 30 of the strip members 26, should it be necessary to move the appliance 10 out from a wall with which the rear of the appliance 10 is in close juxtaposition, the weight of the front of the appliance 10 may be lifted free of the feet 16 and the appliance 10 may be slid forwardly away from the wall over the coating 30 with only the rear feet 18 sliding on the coating 30 of the strip members 26. As the rear feet 18 of the appliance 10 approach the forward ends of the strip members 26, forward movement of the appliance 10 may be terminated and the front legs 12 may be lowered in order that the front feet 16 may stationarily engage the floor covering 22 forwardly of the forward ends of the strips 26. Thereafter, access to the rear of the appliance 10 may be had for cleaning the rear of the appliance or the floor covering 22 between the strip members 26 and rearwardly thereof. After cleaning operations have been completed, the front of the appliance 10 may be elevated to position the feet 16 above the strip members 26 and the appliance 10 may be slid back toward its original position. After the appliance 10 has been moved rearwardly to a position with the front feet 16 thereof again positioned over the front ends of the strip members 26, the front feet 16 of the appliance 10 may again be lowered onto the coatings 30 on the upper surfaces 28 of the strip members 26.

In lieu of the double-sided adhesive tape 34, the undersurfaces of the strips 24 may have adhesive coatings applied directly thereto, or the undersurfaces of the strips may be treated, otherwise, to resisting shifting relative to the floor covering 22.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A combination heavy appliance support and floor protective assembly for use over floor surfaces subject to damage by sliding heavy appliances thereover and for use beneath the supporting legs or feet of such appliances to be supported from said floor surfaces and which should be occasionally slid out from adjacent walls for cleaning of the rear of the appliance and/or the floor surface behind the appliance, said floor protective assembly including thin panel means for positioning over the floor surface from which an appliance is to be supported, said panel means being constructed of hard stiff material and including an upper surface having a hard silicone lubricant coating thereon wherein said panel means includes a lower surface having adhesive means thereon for contact with said floor surface.

2. The combination of claim 1 wherein said adhesive means comprises a downwardly facing adhesive coating thereon for adhesive engagement with said floor coating.

3. The combination of claim 1 wherein said adhesive means comprises an under coating of adhesive of a double sided adhesive panel member also including an upper adhesive coating adhesively secured to the lower surface of said panel.

4. The combination of claim 1 wherein said panel means includes a pair of elongated narrow panel strips adapted to be positioned in parallel relation beneath opposite side front and rear legs of said appliance.

* * * * *